United States Patent [19]

Wirt

[11] 4,364,691
[45] * Dec. 21, 1982

[54] SURFACE WAVE ATTENUATION APPARATUS

[75] Inventor: Leslie S. Wirt, Newhall, Calif.

[73] Assignee: Lockheed Corporation, Burbank, Calif.

[*] Notice: The portion of the term of this patent subsequent to May 8, 1996, has been disclaimed.

[21] Appl. No.: 163,814

[22] Filed: Jun. 27, 1980

[51] Int. Cl.³ .............................................. E02B 3/06
[52] U.S. Cl. ....................................... 405/26; 405/76
[58] Field of Search ....................... 405/26, 27, 30, 35, 405/75, 76, 77; 60/398; 290/53; 415/7

[56] References Cited

U.S. PATENT DOCUMENTS

| 4,123,185 | 10/1978 | Hagen et al. | 405/76 |
| 4,152,895 | 5/1979 | Wirt | 60/398 |
| 4,303,520 | 12/1981 | Wirt | 60/398 X |

FOREIGN PATENT DOCUMENTS

| 826383 | 11/1969 | Canada | 405/27 |
| 461385 | 10/1968 | Switzerland | 405/26 |
| 1373035 | 11/1974 | United Kingdom | 405/27 |

*Primary Examiner*—David H. Corbin
*Attorney, Agent, or Firm*—Frederic P. Smith; John J. Morrissey

[57] ABSTRACT

Apparatus for attenuating waves on the surface of a fluid and for providing a protective calm area is provided comprising means (20) for causing the waves to break, means (30) for directing the broken waves to induce a downward flow of surface fluid, means (34) for discharging the downward flow of surface fluid a preselected distance below the surface of the fluid, and means (48,50,60,62,64) for orienting the wave breaking means to provide a preselected orientation of the wave breaking means relative to the resultant flux vector of the energy of the waves. In a particular embodiment, one or more submerged refractive structures (20) each in the form of a dome-shaped shell, are provided to cause the waves to break. Guide vanes (36) direct the broken surface waves into a centrally disposed vertical standpipe (34) where the fluid flows downward and is then discharged at the bottom of the shell. A fin-like member (48) coupled to the shell aligns itself and the shell with the resultant energy flux vector to provide the preselected orientation of the shell.

3 Claims, 8 Drawing Figures

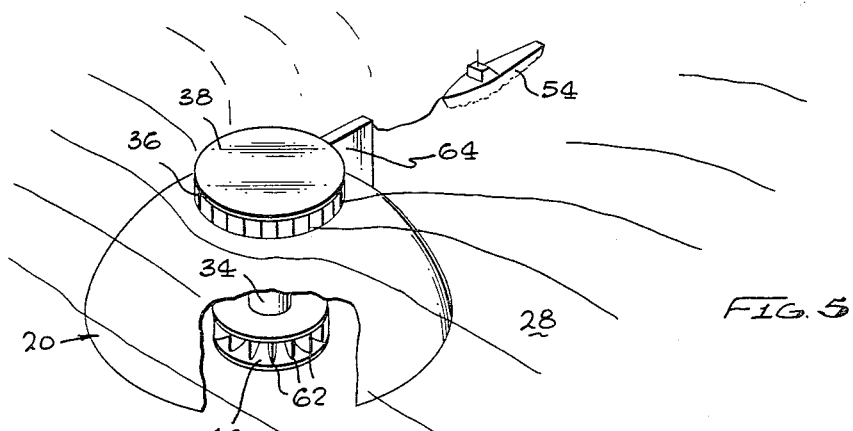
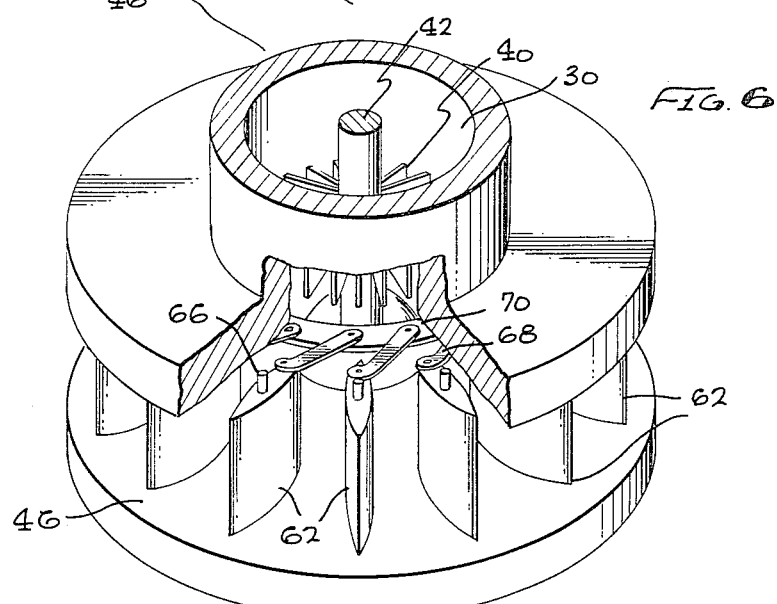
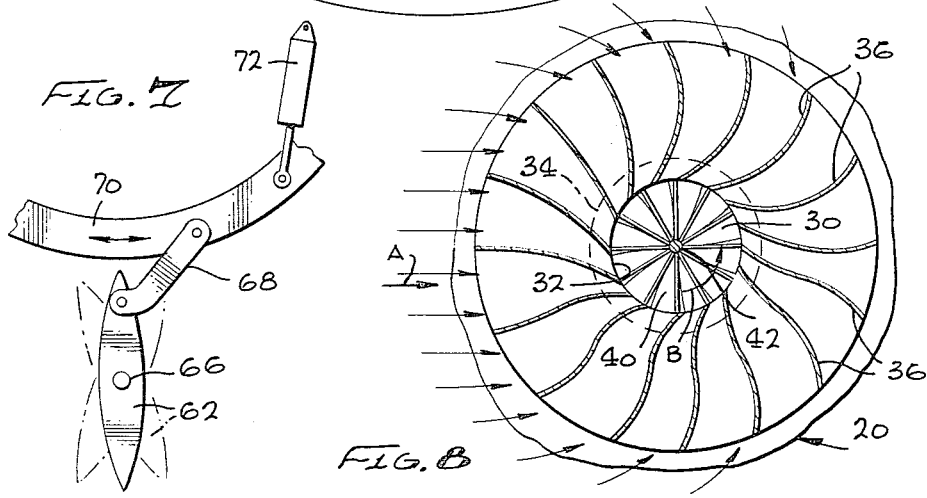

SURFACE WAVE ATTENUATION APPARATUS

TECHNICAL FIELD

The invention relates to the field of surface wave attenuation and, in particular, to apparatus for attenuating surface wave energy and providing a protective calm area for ships and the like.

BACKGROUND ART

This invention is an improvement of the apparatus shown and described in U.S. Pat. No. 4,152,895, issued May 8, 1979, entitled Wave Powered Motor, by the present inventor and assigned to the assignee hereof, the disclosure of which is incorporated herein by reference.

The structure described in the aforementioned prior patent employs a dome-shaped shell which may be floated in a partially submerged condition within the open sea, with the open mouth of the shell nearest the floor. This prior structure causes the surface waves to break, and captures these waves by directing such breaking waves into a vertical standpipe centrally disposed within the shell. Radially-disposed inlet guide vanes impart a rotational motion to the water entering the standpipe. The water within the standpipe flows vertically downward with a vortex motion, and is discharged through a diffuser in the area of the open mouth at the base of the shell. The energy of the waves is extracted by placing a turbine rotor within the flow in the standpipe.

Although the structure of this prior invention is very useful in extracting wave energy, it has been found that this prior structure can be adapted to alternate uses. In the open sea, where wave trains may arrive from several directions at once, there is a single resultant flux vector if the energy transport of each wave train is regarded as a flux vector. If the shell structure is tethered so as to be freely rotatable about its central axis, and a large radial fin or vane is secured to the portion of the shell extending through the surface of the sea, then the apparatus may be made responsive to the above-described resultant flux vector. It has been discovered, by analysis of wave forces on vertical walls, that such a fin will always extend radially to point in the direction of the resultant flux vector and thereby seek the lee side of the shell, that is, the forces of rotation on the shell will rotate the shell until the fin extends into the quietest (wave-free) water.

One practical consequence of this embodiment of the present invention and other embodiments to be described hereafter is that more efficient, unsymmetrical inlet guide vanes may be used even in the open sea. The resulting increase in efficiency enhances the utility of the device for use in attenuating surface waves, and in thereby locally calming the sea surface for the protection of ship moorings, drilling towers, and the like.

It is, therefore, a general object of the present invention to provide a novel and improved structure which functions to attenuate or dissipate surface waves and provide a protective calm area.

It is another object of the present invention to provide a novel and improved structure for attenuating or dissipating surface waves, which structure is partially submerged in the sea and provides a protective calm area.

It is a further object of the present invention to provide a novel and improved structure for attenuating or dissipating surface waves, which structure automatically orients itself in relation to the resultant flux vector of the waves and provides a protective calm area.

DISCLOSURE OF INVENTION

Apparatus for attenuating waves on the surface of a fluid and for providing a calm area is provided comprising means for causing the waves to break, means for directing the broken waves to induce a downward flow of surface fluid, means for discharging the downward flow of surface fluid at a preselected distance below the surface of the fluid, and means for orienting the wave breaking means to provide a preselected orientation of the wave breaking means relative to the resultant flux vector indicating the energy transport of the waves.

In a particular embodiment, an upwardly convex, dome-shaped shell is employed which is submerged just beneath the sea surface and causes the waves to break. The shell is open at the bottom, and has a centrally located fluid inlet opening to which is coupled a vertical cylindrical standpipe. Located about the inlet opening is an array of inlet guide vanes which direct the broken surface waves into the standpipe. The exterior surface of the shell utilizes refraction, due to Fermat's Principle, for concentrating incident wave energy wherein waves, although not directly aimed at the inlet opening but adjacent thereto, are drawn into the inlet opening. By this means, a substantially greater quantity of fluid is caused to enter the vertical standpipe than would otherwise occur. The fluid, after passing downwardly through the standpipe, is discharged at the open bottom of the shell. A fin-like member attached to the exterior surface of the shell is continuously acted upon by wave radiation pressure on each side thereof, thereby causing the shell to pivot so that the wave radiation pressure on each side of the fin is equalized. Upon rotation of the fin-like member (and the attached shell) to the leeward position, the fin-like member and the shell will be aligned with the resultant energy flux vector to provide the preselected orientation of the shell. In a second embodiment, a plurality of adjustable outlet vanes are located within a diffuser coupled to the standpipe, and are pivotable to different inclinations with respect to the standpipe. Depending upon the direction of the inclination of the vanes, the shell will rotate either clockwise or counterclockwise. A sensing mechanism which is incorporated as part of the fin-like member, senses the resultant energy flux and automatically moves the outlet vanes to provide the preselected orientation of the shell.

Many other advantages, features and additional objects of the present invention will become manifest to those versed in the art upon making reference to the detailed description and the accompanying sheets of drawings in which various structural embodiments incorporating the principles of the invention are shown by way of illustrative examples. It is to be expressly understood, however, that the drawings are for purposes of illustration and description only, and are not intended as a definition of the limits of the invention.

BRIEF DESCRIPTION OF DRAWINGS

FIG. 4 is a diagrammatic top plan view of a third embodiment of the apparatus of the present invention;

FIG. 5 is a diagrammatic partly cut-away view of a fourth embodiment of the present invention;

FIG. 6 is an isometric, partial cross-sectional view of the water discharge portion of the fourth embodiment of the invention shown in FIG. 5;

FIG. 7 is a diagrammatic plan view showing the structural arrangement of a single movable outlet vane of the fourth embodiment of the invention shown in FIGS. 6 and 7; and FIG. 8 is a top plan view of non-symmetrical inlet guide vanes used to tangentially direct water into the apparatus of the present invention.

BEST MODE FOR CARRYING OUT THE INVENTION

Figure 1:
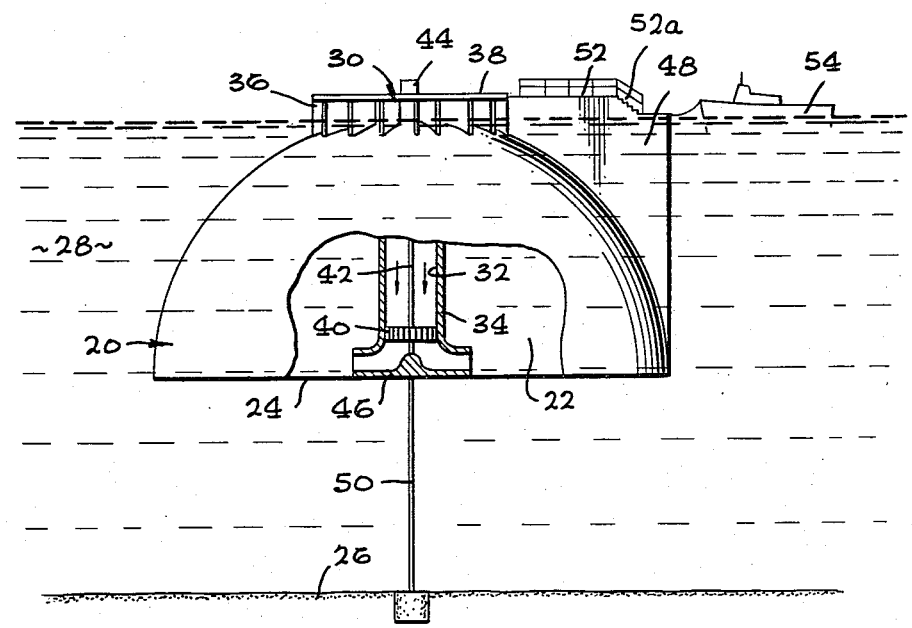
FIG. 1 is a partial cross-sectional side view, diagrammatically illustrating a first embodiment of the surface wave attenuation apparatus of the present invention.
Figure 2:
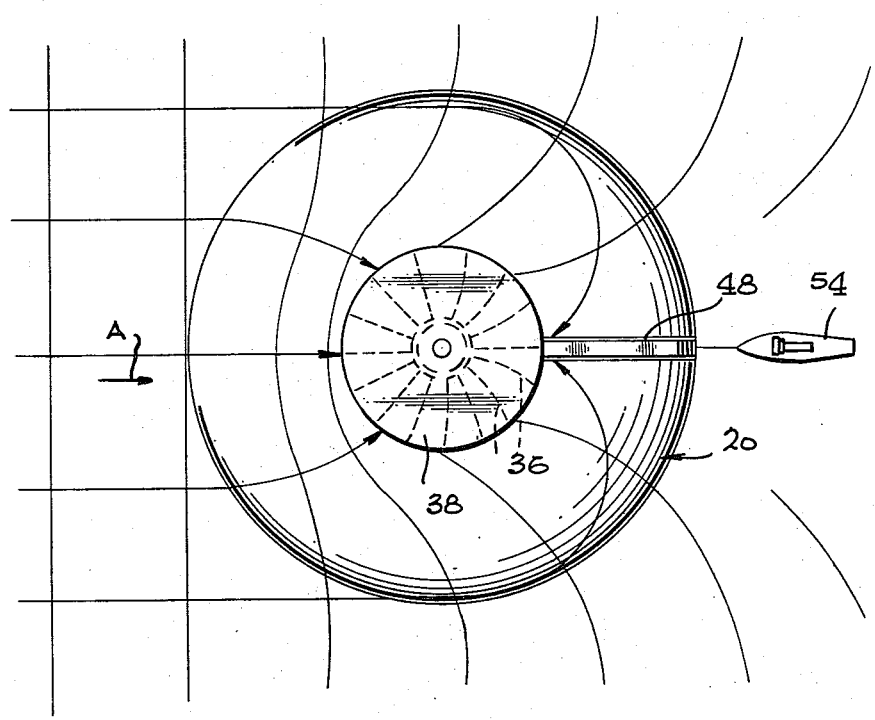
FIG. 2 is a top plan view of the apparatus of FIG. 1.

Referring now to FIGS. 1 and 2, a first embodiment of the surface wave attenuation apparatus of the invention is illustrated which takes the form of a dome-shaped shell 20 200–300 feet in diameter. The dome-shaped shell 20 includes a large interior chamber 22, with the open mouth 24 of the chamber 22 being located nearest the floor 26 of the sea 28. The exterior surface of the shell 20 forms an upwardly convex structure when in position within the sea 28, with the apex thereof being at or below the surface of the sea 28. The shell 20 includes an inlet opening 30 which is centrally located at the apex of the shell 20. The inlet opening 30 connects with an elongated vertical passage 32 formed by a vertical standpipe 34. Fixedly secured to the exterior surface of the shell 20 and located about the inlet opening 30 are a plurality of inlet guide vanes 36. The upper ends of the inlet guide vanes 36 are connected together by a plate 38.

The inlet guide vanes 36 extend initially radially outward from the inlet opening 30, and then may assume preselected arcuate configurations depending on whether they are to receive waves omnidirectionally, or whether they are to receive waves from the overall direction as noted by arrow A of FIG. 2. The exterior configuration of the dome-shaped shell 20 causes the waves to bend in their direction, and to enter between the inlet guide vanes 36 from the sides and even from the rear, as is shown in FIGS. 2 and 4 by the depicted wave grid pattern. This bending of the waves is due to refraction caused by the exterior surface contour of the dome-shaped shell 20, the refraction being based, as stated previously, on Fermat's Principle. Each guide vane 36 is designed for a specific location based on from what direction the guide vane is to receive the wave. In other words, if the guide vane is to receive the wave directly, the guide vane has a certain basic configuration, as is shown by the guide vanes 36 which are located nearest arrow A. The guide vanes which are to receive the wave from the side have a different basic configuration. The guide vanes 36 located on the lee side (the side diametrically opposite arrow A) have a still different basic configuration. In any event; the basic configuration of the vanes 36 is determined by the ray path shape to minimize energy loss in the conducting of the wave into the inlet opening 30.

Each adjacent pair of guide vanes 36 functions to create a channel or path for the water to be conducted therethrough and discharged into the inlet opening 30. The water flows downward through the passage 32 and is dicharged beneath the chamber 22. A turbine 40 coupled to a shaft 42 and a load device 44, such as a generator, and a diffuser 46 are illustrated but are not used in the present embodiment.

The structure shown in FIGS. 1 and 2 includes a vertically disposed fin-like member 48 integrally attached to the exterior surface of the shell 20 to provide a preselected orientation of the shell 20 relative to the resultant energy flux vector of the waves. The sides of the fin-like member 48 are continuously subject to wave radiation pressure. When this wave radiation pressure is balanced, the fin-like member 48 is located leeward of the shell 20 in alignment with arrow A, thus providing a preselected orientation of the shell 20. If the wave radiation pressure on each side of the fin-like member 48 becomes unbalanced, the fin-like member 48 automatically moves until the wave radiation pressure is balanced. This movement pivots the shell 20 about its tether line 50, which is secured to the floor 26 of the sea 28. Therefore, the structure shown in FIGS. 1 and 2 constantly senses the wave direction and maintains itself correctly aligned with respect thereto. The upper surface of the fin-like member 48 will normally be flat and can function to support a walkway 52. The outer end of the walkway 52 includes a series of steps 52A which provide access to the walkway 52. The outermost edge of the fin-like member 48 functions as a mooring station for boats or ships 54. As previously mentioned, the area of the surface of the water off the lee side of the shell 20 comprises quiet water. Therefore, movement of the boat 54 due to wave action is minimal in this area.

Figure 3:
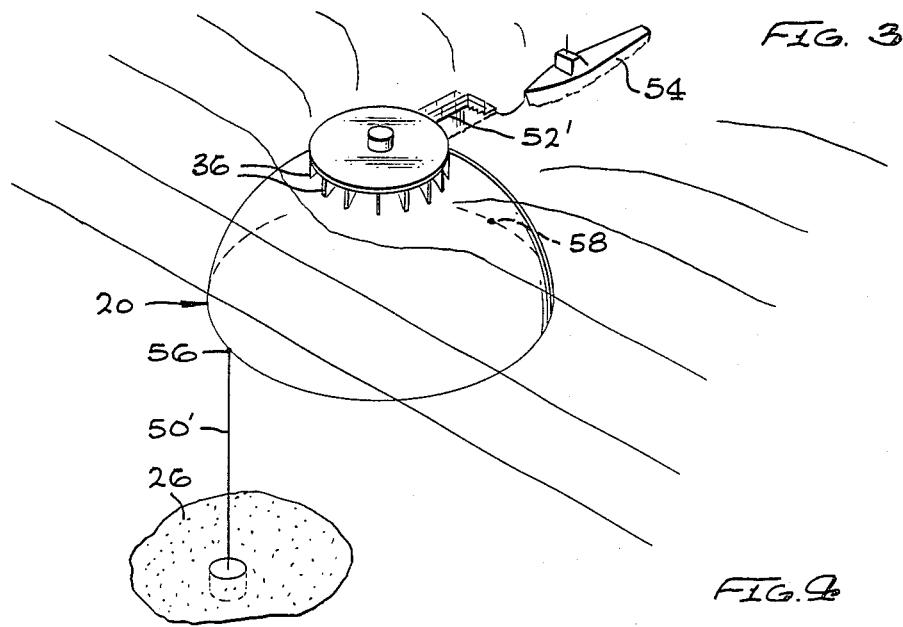
FIG. 3 is a diagrammatic view of a second embodiment of the apparatus of the present invention.
Figure 9:
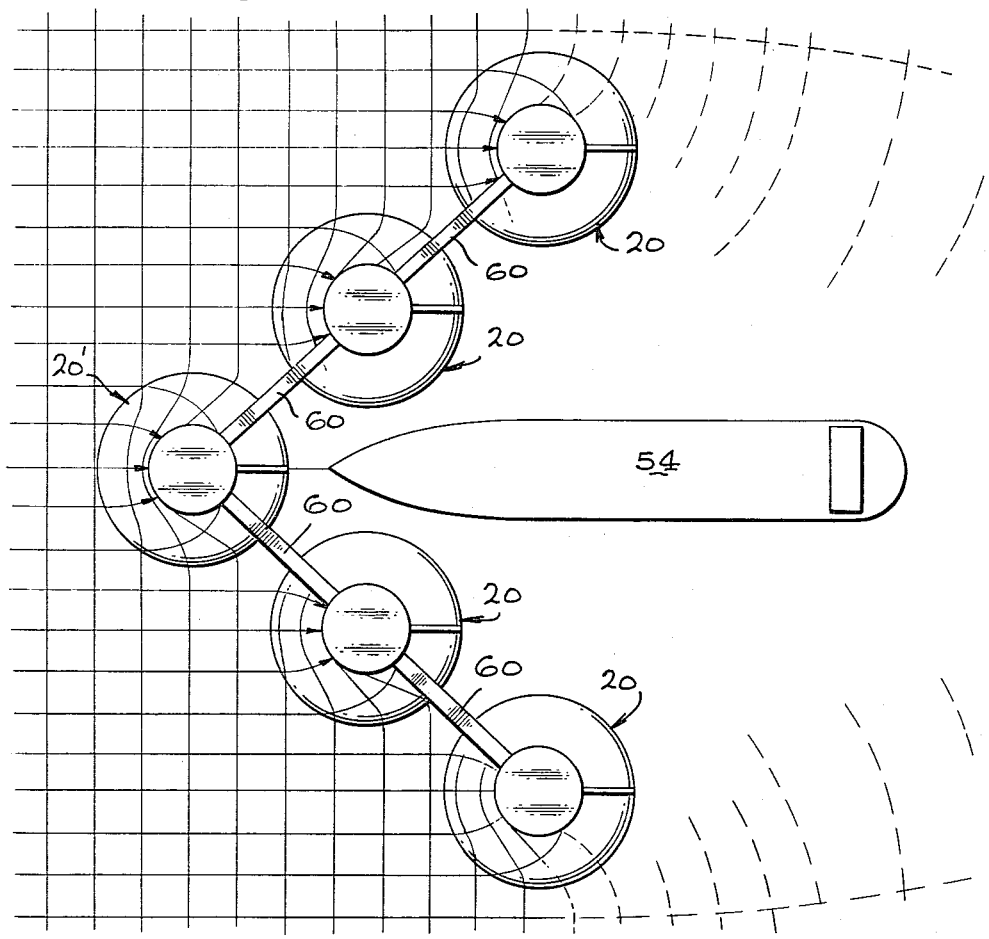

A second embodiment of the present invention is illustrated in FIG. 3. In this embodiment, the shell 20 is asymmetrically tethered by tether line 50' attached to point 56 on the shell 20. The wave radiation pressure on the shell 20 causes the shell 20 to align itself with the resultant energy flux vector of the waves and to cause point 58, opposed to point 56, on the shell 20 to center itself in the quiet water on the lee side of the shell 20. A walkway 52' is appropriately connected to the shell 20 to provide access to the boat 54.

While a single dome-shaped shell 20 would normally be adequate to create quiet water for the mooring of a small ship, in the mooring of larger ships it may be necessary to interconnect a plurality of dome-shaped shells 20. A third embodiment of the present invention is illustrated in FIG. 4, and shows a plurality of spaced-apart ganged shells 20. The shells 20 are interconnected by bridges 60, with the center shell 20' being tethered to the floor of the sea so that the interconnected shells 20 are capable of pivoting about a single axis. The interconnected shells 20 are responsive to wave radiation pressure, and align themselves with the resultant flux vector of the energy of the waves to provide the desired orientation of the shells 20. Although the "V" shaped arrangement shown in FIG. 4 is preferred, the interconnected shells 20 may be arranged in any desirable configuration as long as the configuration is properly responsive to wave radiation pressure to align the shells 20 with the resultant energy flux vector.

Referring now to FIGS. 5, 6 and 7, a fourth embodiment of the invention is illustrated in which the orientation of the shell 20 is accomplished through the use of a plurality of outlet guide vanes 62 coupled to a wave radiation pressure sensitive member in FIG. 5 shown in the form of a fin-like member 64, which is attached to the shell 20. The outlet guide vanes 62 are mounted within the annular discharge opening of the diffuser 46. Each outlet guide vane 62 is pivotally mounted within the bounding walls of the annular opening of the diffuser 46 by means of pivot shaft 66, which extends vertically through each outlet guide vane 62. Each outlet guide vane 62 is connected through a link 68 to a ring 70, which is located interiorly of the diffuser 46. The ring 70 is moved by means of a hydraulic actuator 72 controlled by the pressure sensitive fin-like member 64. One end of the hydraulic actuator 72 is secured to the vertical standpipe 34 or to the bounding walls of the diffuser 46. The ring 70 is pivoted about the longitudinal center axis of the shaft 42, which causes each outlet guide vane 62 to be located in the neutral position shown by the solid lines in FIG. 7 or in different inclinations as represented by the phantom lines in FIG. 7.

The pressure of the discharge flow through the annular opening of the diffuser 46 against the outlet guide vanes 62 will be balanced if the outlet guide vanes 62 are located in the neutral position, thereby not causing the shell 20 to rotate. However, if the outlet guide vanes 62 are located in an inclined position with respect to the neutral position, there will be a force acting against each of the outlet guide vanes 62 due to the pressure of the discharge flow through the openings of the diffuser 46, thereby causing the shell 20 to rotate within the sea 28. The pressure sensitive fin-like member 64 could be firmly affixed to the shell 20 as indicated in FIG. 5, and have pressure sensitive transducers mounted thereon to generate an output signal to actuate the hydraulic actuator 72. Alternatively, the fin-like member 64 could be rotatably attached to the shell 20, with a shaft encoder measuring the inclination of the fin-like member 64 relative to the shell 20 and generating an output signal to actuate the hydraulic actuator 72. In either case, the hydraulic actuator 72 would be actuated to move the ring 70 so as to incline the outlet guide vanes 62 at the desired inclination for rotating the shell 20 to the preselected orientation relative to the resultant energy flux vector of the waves. Once the shell 20 has been rotated to the desired position, the inclination of the outlet guide vanes 62 would be modulated so as to maintain the desired orientation of the shell 20.

If it were desired to extract energy from the apparatus, the inlet guide vanes 36 could be configured as in FIG. 8 so that they would channel water tangentially into the inlet opening 30, with the water rotating in the direction of arrow B in FIG. 8 and creating a vortex in the passage 32. The torque produced by the vortex motion of the swirling water must be counteracted in order for the apparatus to maintain the preselected orientation. In this case, the turbine 40 coupled to the shaft 42 and the load device or generator 44 would serve to extract the swirl energy and generate power. Any residual torque could be counteracted by appropriate positioning of the adjustable outlet guide vanes 62 as the discharge flow from the turbine 40 is directed through the diffuser 46. If it is not desired to use a turbine to extract the swirl energy, the outlet guide vanes 62 could be set to entirely counteract the torque. In addition, the interconnected shells 20 of FIG. 4 could be configured so that the torques produced could balance one another out, as for example by providing a "V" configuration with the shell 20' producing no torque. Alternatively, the shell 20' could be eliminated and the remaining shells could be interconnected and pivotably tethered around a point located at the center of the position of the eliminated shell 20'. In order to extract the maximum amount of energy, the inlet guide vanes 36 would be non-symmetrically placed as stated previously, and as also illustrated in FIG. 8, to direct the maximum amount of water into the inlet opening 30 with the minimum energy loss.

Having described the invention, it is obvious that numerous modifications and departures may be made by those skilled in the art. For example, since most ship propulsion systems have side thrust capability, a moored ship fixedly coupled to the shell could serve as the equivalent of the fin-like member to orient the shell. Thus, the invention is to be construed as being limited only by the spirit and scope of the appended claims.

INDUSTRIAL APPLICABILITY

The invention is useful in attenuating and dissipating ocean waves, thereby providing a calm sea surface for the protection of ship moorings, drilling towers and the like.

I claim:

1. An apparatus for providing a calm mooring area on a sea surface, said sea surface having waves moving thereon, said apparatus comprising a wave attenuating structure that includes:
    (a) a generally dome-like shell for causing said waves to break, said shell being configured to refract said waves so that the waves after breaking flow along said shell toward a central opening at its apex;
    (b) guide vanes secured to said shell for directing said breaking waves into said central opening to induce a downward vortical flow of sea water through said central opening;
    (c) a standpipe having an inlet end and an outlet end, the inlet end being attached to said shell circumjacent said central opening, the outlet end extending into a region beneath said shell into which said downward flow of sea water is discharged;
    (d) diffuser means attached to said outlet end of said standpipe for diffusing said sea water discharged from said standpipe into said region beneath said shell;
    (e) tethering means for securing said shell in a partially submerged position with respect to said sea surface, said tethering means permitting random orientation of said shell with respect to said waves moving on said sea surface; and
    (f) a fin-like member secured to said shell for providing a selected orientation for said shell with respect to the movement of said waves on said sea surface, said selected orientation being such that sea wave pressure is substantially equal on each side of said fin-like member, thereby providing a region of relatively calm water adjacent said fin-like member, said calm water region being said calm mooring area.

2. The apparatus of claim 1 wherein said diffuser means comprises a structure defining an opening through which said sea waater is discharged into said region beneath said shell, a plurality of outlet guide vanes being pivotally mounted in said opening, pivotal motion of said outlet guide vanes being controlled by movement of said fin-like member, said outlet guide vanes thereby facilitating orientation of said shell at said selected orientation.

3. The apparatus of claim 1 further comprising a plurality of said wave attenuating structures, said wave attenuating structures being interconnected, one of said wave attenuating structures being secured to the sea bottom, all of said wave attenuating structures thereby being movable as a unit so that the shell of each wave attenuating structure assumes said selected orientation with respect to the movement of said waves on said sea surface.

* * * * *